US012618022B2

(12) United States Patent
Debreczeni et al.

(10) Patent No.: US 12,618,022 B2
(45) Date of Patent: *May 5, 2026

(54) WATER-SOLUBLE UNIT DOSE ARTICLE COMPRISING A NARROW RANGE ETHOXYLATE ALKYL ALCOHOL NON-IONIC SURFACTANT

(71) Applicant: The Procter & Gamble Company, Cincinnati, OH (US)

(72) Inventors: Mate Debreczeni, Brussels (BE); Karel Jozef Maria Depoot, Anzegem-Vichte (BE); Robby Renilde François Keuleers, Lippelo (BE); Julien Labie, Brussels (BE); Phillip Kyle Vinson, Fairfield, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 321 days.

This patent is subject to a terminal disclaimer.

(21) Appl. No.: 18/116,356

(22) Filed: Mar. 2, 2023

(65) Prior Publication Data

US 2023/0279310 A1 Sep. 7, 2023

(30) Foreign Application Priority Data

Mar. 2, 2022 (EP) .................................... 22159710

(51) Int. Cl.

| | |
|---|---|
| ***C11D 1/02*** | (2006.01) |
| ***C11D 1/66*** | (2006.01) |
| ***C11D 1/72*** | (2006.01) |
| ***C11D 1/83*** | (2006.01) |
| ***C11D 17/04*** | (2006.01) |

(52) U.S. Cl.
CPC .............. *C11D 1/66* (2013.01); *C11D 17/043* (2013.01)

(58) Field of Classification Search
CPC .... C11D 1/02; C11D 1/72; C11D 1/83; C11D 17/042
See application file for complete search history.

(56) References Cited

U.S. PATENT DOCUMENTS

| | | | |
|---|---|---|---|
| 4,732,694 | A | 3/1988 | Gowland et al. |
| 4,886,615 | A | 12/1989 | Dehan |
| 5,403,516 | A | 4/1995 | Bator et al. |
| 8,697,622 | B2 | 4/2014 | Lentsch et al. |
| 9,303,240 | B2 | 4/2016 | Lentsch et al. |
| 9,493,725 | B2 | 11/2016 | Vinson et al. |

(Continued)

FOREIGN PATENT DOCUMENTS

| | | | |
|---|---|---|---|
| EP | 0158464 | A1 | 10/1985 |
| EP | 3279303 | A1 | 2/2018 |

(Continued)

OTHER PUBLICATIONS

PCT Search Report and Written Opinion for PCT/US2023/063536 dated Jun. 29, 2023 ,8 pages.

(Continued)

*Primary Examiner* — Brian P Mruk

(74) *Attorney, Agent, or Firm* — Abigail O. Idokogi; Andrew J. Mueller

(57) ABSTRACT

Water-soluble unit dose article comprising a liquid laundry detergent composition, wherein the liquid laundry detergent composition contains a narrow range ethoxylated alcohol non-ionic surfactant.

15 Claims, 1 Drawing Sheet

(56) References Cited

U.S. PATENT DOCUMENTS

| | | | |
|---|---|---|---|
| 9,689,088 B2 | 6/2017 | Goodwin et al. | |
| 9,771,546 B2 | 9/2017 | Panandiker et al. | |
| 9,809,782 B2 | 11/2017 | Panandiker et al. | |
| 9,809,783 B2 | 11/2017 | Fossum et al. | |
| 9,845,445 B2 | 12/2017 | Li et al. | |
| 9,926,520 B2 | 3/2018 | Panandiker et al. | |
| 9,951,297 B2 | 4/2018 | Panandiker | |
| 10,351,810 B2 | 7/2019 | Maes et al. | |
| 10,392,588 B2 | 8/2019 | Keuleers et al. | |
| 10,428,297 B2 | 10/2019 | Souter et al. | |
| 10,443,019 B2 | 10/2019 | Fossum et al. | |
| 12,365,855 B2 | 7/2025 | Andriessen et al. | |
| 2003/0054966 A1 | 3/2003 | Bone et al. | |
| 2003/0087787 A1 | 5/2003 | Man et al. | |
| 2006/0257281 A1 | 11/2006 | Weide | |
| 2010/0192986 A1 | 8/2010 | Brooker et al. | |
| 2013/0172227 A1 | 7/2013 | Ogura et al. | |
| 2015/0315517 A1 | 11/2015 | Man et al. | |
| 2015/0329807 A1 | 11/2015 | Naqvi | |
| 2016/0355752 A1 | 12/2016 | Souter et al. | |
| 2016/0355766 A1 | 12/2016 | Brooker et al. | |
| 2016/0355767 A1 | 12/2016 | Souter et al. | |
| 2017/0009191 A1 | 1/2017 | Maes | |
| 2017/0114310 A1 | 4/2017 | Schmiedel et al. | |
| 2017/0211018 A1 | 7/2017 | Dykstra | |
| 2017/0226447 A1* | 8/2017 | Keuleers | C11D 17/045 |
| 2019/0048288 A1 | 2/2019 | Bouniol et al. | |
| 2019/0256801 A1 | 8/2019 | Krubasik et al. | |
| 2019/0264139 A1 | 8/2019 | Lant et al. | |
| 2019/0279784 A1 | 9/2019 | Knerr | |
| 2019/0330563 A1 | 10/2019 | Man et al. | |
| 2020/0048588 A1 | 2/2020 | Van Elsen et al. | |
| 2020/0131453 A1 | 4/2020 | Dahlquist Howlett et al. | |
| 2020/0199503 A1 | 6/2020 | Piorkowski et al. | |
| 2021/0230513 A1* | 7/2021 | Meier | C07F 13/005 |
| 2021/0277338 A1 | 9/2021 | Watson | |
| 2021/0380902 A1 | 12/2021 | Vinson et al. | |
| 2022/0073846 A1 | 3/2022 | Andriessen et al. | |
| 2022/0106543 A1 | 4/2022 | Andriessen et al. | |
| 2024/0117272 A1 | 4/2024 | Vinson | |

FOREIGN PATENT DOCUMENTS

| | | | | |
|---|---|---|---|---|
| EP | 3495466 A1 | 6/2019 | | |
| EP | 3848439 A1 | 7/2021 | | |
| EP | 3926030 | * | 12/2021 | C11D 17/04 |
| EP | 3926030 A1 | 12/2021 | | |
| EP | 3967740 A1 | 3/2022 | | |
| JP | S638496 A | 1/1988 | | |
| JP | 2000265199 A | 9/2000 | | |
| JP | 2001262195 A | 9/2001 | | |
| JP | 2002294282 A | 10/2002 | | |
| JP | 2016124985 A | 7/2016 | | |
| WO | 02102956 A1 | 12/2002 | | |
| WO | 2014158662 A1 | 10/2014 | | |
| WO | 2017131799 A1 | 8/2017 | | |
| WO | 2019107543 A1 | 6/2019 | | |
| WO | 2021247177 A1 | 12/2021 | | |
| WO | 2022128368 A1 | 6/2022 | | |

OTHER PUBLICATIONS

All Office Actions; U.S. Appl. No. 17/469,913, filed Sep. 9, 2021.
All Office Actions; U.S. Appl. No. 18/116,382, filed Mar. 2, 2023.
All Office Actions; U.S. Appl. No. 18/116,512, filed Mar. 2, 2023.
Office Actions; U.S. Appl. No. 18/116,369, filed Mar. 2, 2023.
Basf; Superior Performance With Sustainable Ingredients, Retrieved from the Internet: URL: https: //assets-global-files.com/5fc922269c5ed09aea1f7c22/60dc560c58d6335. 5794e0b08_Lutensol%20Brochurel20122020.pdf [retrieved on Jul. 25, 2022], XP055945769, dated Jan. 12, 2020, pp. 1-32.
Extended EP Search Report and Written Opinion for 22159710.7 dated Aug. 18, 2022, 06 pages.
Unpublished U.S. Appl. No. 18/116,369, filed Mar. 2, 2023, to Mate Debreczeni et al.
Unpublished U.S. Appl. No. 18/116,382, filed Mar. 2, 2023, to Hilde Francoise Louise Andriessen et al.
Unpublished U.S. Appl. No. 18/116,512, filed Mar. 2, 2023, to Hilde Francoise Louise Andriessen et al.
All Office Actions; U.S. Appl. No. 18/582,069, filed Feb. 20, 2024.
Unpublished U.S. Appl. No. 18/582,069, filed Feb. 20, 2024, to Hilde Francoise Louise Andriessen et al.

* cited by examiner

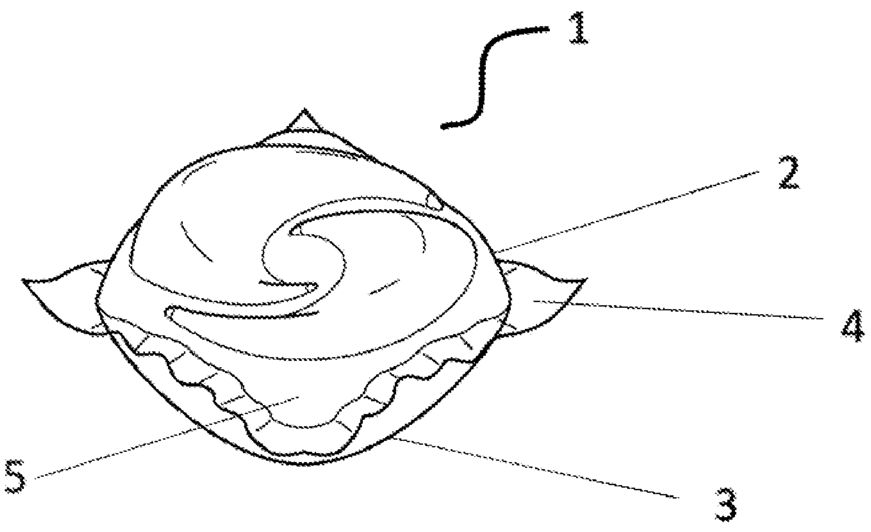
1
2
4
5
3

WATER-SOLUBLE UNIT DOSE ARTICLE COMPRISING A NARROW RANGE ETHOXYLATE ALKYL ALCOHOL NON-IONIC SURFACTANT

FIELD OF THE INVENTION

Water-soluble unit dose article comprising a liquid laundry detergent composition, wherein the liquid laundry detergent composition contains a narrow range ethoxylated alcohol non-ionic surfactant.

BACKGROUND OF THE INVENTION

Water-soluble unit dose articles are liked by consumers as they are convenient and efficient to use. Such water-soluble unit dose articles often comprise laundry detergent compositions. Without wishing to be bound by theory, when the water-soluble unit dose article is added to water, the film dissolves/disintegrates releasing the internal contents into the surrounding water to create a wash liquor.

Often, liquid laundry detergent compositions housed within the water-soluble unit dose article are formulated with ethoxylated alcohol non-ionic surfactant. These ethoxylated alcohol non-ionic surfactants are typically derived from natural or synthetic alcohol sources, including OXO-derived alcohol sources such as commercially available under the Neodol tradename, or alternative sources such as those commercially available under the Marlipal and Surfonic tradenames amongst others. Traditionally the alcohols are consequently ethoxylated using a commonly known ethoxylation process which typically yields a broad ethoxylation range distribution.

Some formulators tend to formulate the ethoxylated alkyl alcohol non-ionic surfactants at low levels in the liquid laundry detergent composition housed in the water-soluble unit dose article. Without wishing to be bound by theory, when single variably increasing the ethoxylated alcohol level of such broad ethoxylation range ethoxylated alcohol nonionic surfactants, the low water liquid laundry detergent compositions for use in water-soluble unit dose articles tends to significantly thicken upon initial dilution with water. Additionally, the elongational viscosity increases rendering the liquid laundry detergent composition overall harder to disperse in the water. Both effects lead to a delayed product dissolution time, which is non-preferred especially when considering the trend of moving to shorter, colder and lower water wash cycles. This effect has been observed for different starting alcohol sources (primary and secondary alcohols), variations in starting primary alcohol compositions, and variations in average degree of ethoxylation.

However, formulators would like to increase the ethoxylated alcohol non-ionic surfactant levels in water-soluble unit dose articles comprising liquid laundry detergent compositions in order to boost overall cleaning benefit to fabrics, for example, when targeting dingy soils on worn fabrics.

It was surprisingly found that a water-soluble unit dose article according to the present invention comprising a narrow range ethoxylated alcohol nonionic surfactant provided reduced thickening upon dilution and reduced elongational viscosity impact and consequently yielded improved product dissolution properties with respect to the low water liquid laundry detergent composition within said water-soluble unit dose article.

SUMMARY OF THE INVENTION

A water-soluble unit dose article comprising a water-soluble film and a liquid laundry detergent composition;

wherein the liquid laundry detergent composition comprises a non-ionic surfactant, wherein the non-ionic surfactant comprises an ethoxylated alcohol non-ionic surfactant, wherein the ethoxylated alcohol non-ionic surfactant comprises a narrow range ethoxylated alcohol non-ionic surfactant;

wherein the narrow range ethoxylated alcohol non-ionic surfactant comprises an alkyl chain having an average of from 8 to 18, preferably 10 to 16, more preferably 12 to 15 carbon atoms;

wherein the narrow range ethoxylated alcohol non-ionic surfactant has an average degree of ethoxylation between 5 and 12, preferably between 6 and 10; and wherein the narrow range ethoxylated alcohol non-ionic surfactant comprises polyethoxy groups, and wherein at least 85% by weight of the total narrow range ethoxylated alcohol surfactant are ethoxylated alcohol non-ionic surfactant molecules comprising a polyethoxy group comprising between 5 and 12, preferably between 6 and 10 ethoxy groups, and wherein the liquid laundry detergent composition comprises between 1% and 20% by weight of the liquid laundry detergent composition of water.

BRIEF DESCRIPTION OF THE DRAWINGS

FIG. 1 is a water-soluble unit dose article according to the present invention.

DETAILED DESCRIPTION OF THE INVENTION

Water-Soluble Unit Dose Article

The present invention discloses a water-soluble unit dose article comprising a water-soluble film and a liquid laundry detergent composition. The water-soluble film and the liquid laundry detergent composition are described in more detail below.

The water-soluble unit dose article comprises the water-soluble film shaped such that the unit-dose article comprises at least one internal compartment surrounded by the water-soluble film. The unit dose article may comprise a first water-soluble film and a second water-soluble film sealed to one another such to define the internal compartment. The water-soluble unit dose article is constructed such that the detergent composition does not leak out of the compartment during storage. However, upon addition of the water-soluble unit dose article to water, the water-soluble film dissolves and releases the contents of the internal compartment into the wash liquor.

The compartment should be understood as meaning a closed internal space within the unit dose article, which holds the detergent composition. During manufacture, a first water-soluble film may be shaped to comprise an open compartment into which the detergent composition is added. A second water-soluble film is then laid over the first film in such an orientation as to close the opening of the compartment. The first and second films are then sealed together along a seal region.

The unit dose article may comprise more than one compartment, even at least two compartments, or even at least three compartments, or even at least four compartments. The compartments may be arranged in superposed orientation, i.e. one positioned on top of the other. In such an orientation the unit dose article will comprise at least three films, top, one or more middle, and bottom. Alternatively, the compartments may be positioned in a side-by-side orientation, i.e. one orientated next to the other. The compartments may even be orientated in a 'tyre and rim' arrangement, i.e. a first compartment is positioned next to a second compartment, but the first compartment at least partially surrounds the second compartment but does not completely enclose the second compartment. Alternatively, one compartment may be completely enclosed within another compartment.

Wherein the unit dose article comprises at least two compartments, one of the compartments may be smaller than the other compartment. Wherein the unit dose article comprises at least three compartments, two of the compartments may be smaller than the third compartment, and preferably the smaller compartments are superposed on the larger compartment. The superposed compartments preferably are orientated side-by-side. The unit dose article may comprise at least four compartments, three of the compartments may be smaller than the fourth compartment, and preferably the smaller compartments are superposed on the larger compartment. The superposed compartments preferably are orientated side-by-side.

In a multi-compartment orientation, the detergent composition according to the present invention may be comprised in at least one of the compartments. It may for example be comprised in just one compartment, or may be comprised in two compartments, or even in three compartments, or even in four compartments.

Each compartment may comprise the same or different compositions. The different compositions could all be in the same form, or they may be in different forms.

The water-soluble unit dose article may comprise at least two internal compartments, wherein the liquid laundry detergent composition is comprised in at least one of the compartments, preferably wherein the unit dose article comprises at least three compartments, wherein the detergent composition is comprised in at least one of the compartments.

FIG. 1 discloses a water-soluble unit dose article (1) according to the present invention. The water-soluble unit dose article (1) comprises a first water-soluble film (2) and a second water-soluble film (3) which are sealed together at a seal region (4). The liquid laundry detergent composition (5) is comprised within the water-soluble soluble unit dose article (1).

Water-Soluble Film

The film of the present invention is soluble or dispersible in water. The water-soluble film preferably has a thickness of from 20 to 150 micron, preferably 35 to 125 micron, even more preferably 50 to 110 micron, most preferably about 76 micron.

Preferably, the film has a water-solubility of at least 50%, preferably at least 75% or even at least 95%, as measured by the method set out here after using a glass-filter with a maximum pore size of 20 microns:

5 grams±0.1 gram of film material is added in a pre-weighed 3 L beaker and 2 L±5 ml of distilled water is added. This is stirred vigorously on a magnetic stirrer, Labline model No. 1250 or equivalent and 5 cm magnetic stirrer, set at 600 rpm, for 30 minutes at 30° C. Then, the mixture is filtered through a folded qualitative sintered-glass filter with a pore size as defined above (max. 20 micron). The water is dried off from the collected filtrate by any conventional method, and the weight of the remaining material is determined (which is the dissolved or dispersed fraction). Then, the percentage solubility or dispersability can be calculated.

Preferred film materials are preferably polymeric materials. The film material can, for example, be obtained by casting, blow-moulding, extrusion or blown extrusion of the polymeric material, as known in the art.

Preferred polymers, copolymers or derivatives thereof suitable for use as pouch material are selected from polyvinyl alcohols, polyvinyl pyrrolidone, polyalkylene oxides, acrylamide, acrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatine, natural gums such as xanthum and carragum. More preferred polymers are selected from polyacrylates and water-soluble acrylate copolymers, methylcellulose, carboxymethylcellulose sodium, dextrin, ethylcellulose, hydroxyethyl cellulose, hydroxypropyl methylcellulose, maltodextrin, polymethacrylates, and most preferably selected from polyvinyl alcohols, polyvinyl alcohol copolymers and hydroxypropyl methyl cellulose (HPMC), and combinations thereof. Preferably, the level of polymer in the pouch material, for example a PVA polymer, is at least 60%. The polymer can have any weight average molecular weight, preferably from about 1000 to 1,000,000, more preferably from about 10,000 to 300,000 yet more preferably from about 20,000 to 150,000.

Preferably, the water-soluble film comprises polyvinylalcohol polymer, preferably wherein the polyvinylalcohol polymer comprises polyvinyl alcohol homopolymer or copolymer, preferably a blend of polyvinylalcohol homopolymers and/or polyvinylalcohol copolymers, preferably wherein the polyvinylalcohol copolymers are selected from sulphonated and carboxylated anionic polyvinylalcohol copolymers especially carboxylated anionic polyvinylalcohol copolymers, most preferably wherein the polyvinylalcohol polymer comprises a blend of a polyvinylalcohol homopolymer and a carboxylated anionic polyvinylalcohol copolymer or a blend of polyvinylalcohol homopolymers.

Preferred films exhibit good dissolution in cold water, meaning unheated distilled water. Preferably such films exhibit good dissolution at temperatures of 24° C., even more preferably at 10° C. By good dissolution it is meant that the film exhibits water-solubility of at least 50%, preferably at least 75% or even at least 95%, as measured by the method set out here after using a glass-filter with a maximum pore size of 20 microns, described above.

Preferred films are those supplied by Monosol under the trade references M8630, M8900, M8779, M8310.

The film may be opaque, transparent or translucent. The film may comprise a printed area.

The area of print may be achieved using standard techniques, such as flexographic printing or inkjet printing.

The film may comprise an aversive agent, for example a bittering agent. Suitable bittering agents include, but are not limited to, naringin, sucrose octaacetate, quinine hydrochloride, denatonium benzoate, or mixtures thereof. Any suitable level of aversive agent may be used in the film. Suitable levels include, but are not limited to, 1 to 5000 ppm, or even 100 to 2500 ppm, or even 250 to 2000 ppm.

Preferably, the water-soluble film or water-soluble unit dose article or both are coated in a lubricating agent, preferably, wherein the lubricating agent is selected from talc, zinc oxide, silicas, siloxanes, zeolites, silicic acid, alumina, sodium sulphate, potassium sulphate, calcium carbonate, magnesium carbonate, sodium citrate, sodium tripolyphosphate, potassium citrate, potassium tripolyphosphate, calcium stearate, zinc stearate, magnesium stearate, starch, modified starches, clay, kaolin, gypsum, cyclodextrins or mixtures thereof.

Preferably, the water-soluble film, and each individual component thereof, independently comprises between 0 ppm and 20 ppm, preferably between 0 ppm and 15 ppm, more preferably between 0 ppm and 10 ppm, even more preferably between 0 ppm and 5 ppm, even more preferably between 0 ppm and 1 ppm, even more preferably between 0 ppb and 100 ppb, most preferably 0 ppb dioxane. Those skilled in the art will be aware of known methods and techniques to determine the dioxane level within water-soluble films and ingredients thereof.

Liquid Laundry Detergent Composition

The water-soluble unit dose article comprises a liquid laundry detergent composition. The term 'liquid laundry detergent composition' refers to any laundry detergent composition comprising a liquid capable of wetting and treating a fabric, and includes, but is not limited to, liquids, gels, pastes, dispersions and the like. The liquid composition can include solids or gases in suitably subdivided form, but the liquid composition excludes forms which are non-fluid overall, such as tablets or granules The liquid detergent composition can be used in a fabric hand wash operation or may be used in an automatic machine fabric wash operation.

The liquid laundry detergent composition comprises a non-ionic surfactant. The non-ionic surfactant is described in more detail below.

The liquid laundry detergent composition may comprise a non-soap anionic surfactant, wherein the non-soap anionic surfactant is preferably selected from neutralised linear alkylbenzene sulphonate, neutralised alkyl sulphate anionic surfactant selected from neutralised alkoxylated alkyl sulphate, neutralised non-alkoxylated alkyl sulphate, and mixtures thereof, or a mixture thereof. The non-soap anionic surfactant may comprise a mixture of neutralised linear alkylbenzene sulphonate and neutralised alkyl sulphate anionic surfactant. The weight ratio of neutralised linear alkylbenzene sulphonate to neutralised alkyl sulphate anionic surfactant may be from 1:2 to 9:1, or from 1:1 to 7:1, or from 2:1 to 6:1, or from 2:1 to 5:1.

Preferably, the non-soap anionic surfactant comprises linear alkylbenzene sulphonate. Preferably, the linear alkylbenzene sulphonate comprises $C_{10}$-$C_{16}$ alkyl benzene sulfonate, $C_{11}$-$C_{14}$ alkyl benzene sulphonate or a mixture thereof. Preferably, the alkylbenzene sulphonate is an amine neutralized alkylbenzene sulphonate, an alkali metal neutralized alkylbenzene sulphonate or a mixture thereof. The amine is preferably selected from monoethanolamine, triethanolamine, monoisopropanolamine or mixtures thereof. The alkali metal is preferably selected from sodium, potassium, magnesium or a mixture thereof. Preferably, the liquid laundry detergent composition comprises between 1% and 40%, preferably between 3% and 40%, more preferably between 6% and 35% by weight of the liquid laundry detergent composition of the linear alkylbenzene sulphonate.

Preferably, the non-soap anionic surfactant comprises an alkyl sulphate anionic surfactant wherein the alkyl sulphate anionic surfactant is selected from alkyl sulphate, an alkoxylated alkyl sulphate or a mixture thereof. The alkyl sulphate anionic surfactant may be a primary or a secondary alkyl sulphate anionic surfactant, or a mixture thereof, preferably a primary alkyl sulphate anionic surfactant. Preferably, the alkoxylated alkyl sulphate comprises ethoxylated alkyl sulphate, propoxylated alkyl sulphate, a mixed ethoxylated/propoxylated alkyl sulphate, or a mixture thereof, more preferably an ethoxylated alkyl sulphate. Preferably, the ethoxylated alkyl sulphate has an average degree of ethoxylation of between 0.1 to 5, preferably between 0.5 and 3. Preferably, the ethoxylated alkyl sulphate has an average alkyl chain length of between 8 and 18, more preferably between 10 and 16, most preferably between 12 and 15. Preferably, the alkyl chain of the alkyl sulphate anionic surfactant is linear, branched or a mixture thereof. Preferably, the branched alkyl sulphate anionic surfactant is a branched primary alkyl sulphate, a branched secondary alkyl sulphate, or a mixture thereof, preferably a branched primary alkyl sulphate, wherein the branching preferably is in the 2-position, or alternatively might be present further down the alkyl chain, or could be multi-branched with branches spread over the alkyl chain. The weight average degree of branching of alkyl sulphate anionic surfactant may be from 0% to 100% preferably from 0% to 95%, more preferably from 0% to 60%, most preferably from 0% to 20%. Alternatively, the weight average degree of branching of alkyl sulphate anionic surfactant may be from 70% to 100%, preferably from 80% to 90%. Preferably, the alkyl chain is selected from naturally derived material, synthetically derived material or mixtures thereof. Preferably, the synthetically derived material comprises oxo-synthesized material, Ziegler-synthesized material, Guerbet-synthesized material, aldol condensation-synthesized material, Fischer-Tropsch-synthesized material, iso-alkyl synthesized material, or mixtures thereof, preferably oxo-synthesized material. Preferably, the liquid laundry detergent composition comprises between 1% and 35%, preferably between 3% and 30%, more preferably between 6% and 20% by weight of the liquid laundry detergent composition of the alkyl sulphate anionic surfactant.

The weight ratio of non-soap anionic surfactant to ethoxylated alcohol non-ionic surfactant in the liquid laundry detergent composition is between 1:1 to 20:1, or from 1:1 to 15:1, or from 1:1 to 10:1, or from 1:1 to 5:1.

The liquid laundry detergent composition may comprise a fatty acid, preferably a neutralized fatty acid soap. The fatty acid soap may be an amine neutralized fatty acid soap, wherein the amine is an alkanolamine more preferably selected from monoethanolamine, diethanolamine, triethanolamine, monoisopropanolamine or a mixture thereof, more preferably monoethanolamine. The liquid laundry detergent composition may comprise between 1.5% and 20%, between 2% and 15%, between 3% and 12%, or between 4% and 10% by weight of the liquid laundry detergent composition of fatty acid, preferably a neutralized fatty acid soap.

The liquid laundry detergent comprises between 1% and 20%, preferably between 5% and 15% by weight of the liquid detergent composition of water.

Preferably, the liquid laundry detergent composition comprises between 10% and 40%, preferably between 15% and 30% by weight of the liquid laundry detergent composition of a non-aqueous solvent, preferably wherein the non-aqueous solvent is selected from 1,2-propanediol, dipropylene glycol, tripropyleneglycol, glycerol, sorbitol, polyethylene glycol, ethoxylated glycerin or a mixture thereof.

Preferably, the liquid laundry detergent composition comprises an adjunct ingredient selected from the group comprising builders, perfumes, enzymes, citrate, bleach, bleach catalyst, dye, hueing dye, brightener, cleaning polymers including alkoxylated polyamines and polyethyleneimines, soil release polymer, fabric care polymers including cationic hydroxyethyl celluloses, cationic guar gums and cationic polyglucans, surfactant, solvent, dye transfer inhibitors, chelant, encapsulated perfume, polycarboxylates, structurant, pH trimming agents, anti-oxidants including Ralox 35, and mixtures thereof.

Preferably, the laundry detergent composition comprises a further enzyme selected from the group comprising hemicellulases, peroxidases, proteases, cellulases, xylanases, lipases, phospholipases, esterases, cutinases, pectinases, keratanases, reductases, oxidases, phenoloxidases, lipoxygenases, ligninases, pullulanases, tannases, pentosanases, malanases, ß-glucanases, arabinosidases, hyaluronidase, chondroitinase, laccase, xyloglucanases, mannanases and amylases, nuclease or mixtures thereof, preferably a further enzyme selected from the group comprising proteases, amylase, cellulase, lipases, xyloglucanases, mannanases, and mixtures thereof.

Preferably, the liquid laundry detergent composition has a pH between 6 and 10, more preferably between 6.5 and 8.9, most preferably between 7 and 8, wherein the pH of the laundry detergent composition is measured as a 10% product concentration in demineralized water at 20° C.

The liquid laundry detergent composition may be Newtonian or non-Newtonian. Preferably, the liquid laundry detergent composition is non-Newtonian. Without wishing to be bound by theory, a non-Newtonian liquid has properties that differ from those of a Newtonian liquid, more specifically, the viscosity of non-Newtonian liquids is dependent on shear rate, while a Newtonian liquid has a constant viscosity independent of the applied shear rate. The decreased viscosity upon shear application for non-Newtonian liquids is thought to further facilitate liquid detergent dissolution. The liquid laundry detergent composition described herein can have any suitable viscosity depending on factors such as formulated ingredients and purpose of the composition.

Non-Ionic Surfactant

The liquid laundry detergent composition comprises a non-ionic surfactant. The non-ionic surfactant comprises an ethoxylated alcohol non-ionic surfactant. Preferably, the liquid laundry detergent composition comprises between 3% and 30%, or between 5% and 25%, or between 10% and 20% by weight of the liquid laundry detergent composition of the ethoxylated alcohol non-ionic surfactant.

The ethoxylated alcohol non-ionic surfactant comprises a narrow range ethoxylated alcohol non-ionic surfactant; wherein the narrow range ethoxylated alcohol non-ionic surfactant comprises an alkyl chain having an average of from 8 to 18 carbon atoms, preferably of from 10 to 16 more preferably 12 to 15 carbon atoms; wherein the narrow range ethoxylated alcohol non-ionic surfactant has an average degree of ethoxylation between 5 and 12, preferably between 6 and 10; and wherein the narrow range ethoxylated alcohol non-ionic surfactant comprises polyethoxy groups, and wherein at least 85% by weight of the total narrow range ethoxylated alcohol surfactant are ethoxylated alcohol non-ionic surfactant molecules comprising a polyethoxy group comprising between 5 and 12, preferably between 6 and 10 ethoxy groups.

Narrow-range ethoxylates (NREs) are alcohol polyglycol ethers with a narrow homolog distribution and are known nonionic surfactants. Peaked alkoxylation and peaked ethoxylation are also often used to describe the process and materials produced. They can be produced industrially, for example, by the addition of ethylene oxide onto alcohols in the presence of suitable catalysts (layer compounds which have been calcined or hydrophobized with fatty acids). Examples of narrow range alkoxylation catalysts include many alkaline earth (Mg, Ca, Ba, Sr, etc.) derived catalysts, Lewis acid catalysts, such as Zirconium dodecanoxide sulfate, and certain boron halide catalysts, such as those described by Dupont and of the form MB(OR1)x(X)4-x or B(OR1)3/MX wherein R1 is a linear, branched, cyclic, or aromatic hydrocarbyl group, optionally substituted, having from 1 to 30 carbon atoms, M is Na+, K+, Li+, R2R3R4R5N+, or R2R3R4R5P+, where R2, R3, R4, and R5 independently are hydrocarbyl groups, and x is 1 to 3. This process can also be carried out on a variety of other hydrophobes and using different alkoxylating compounds (e.g., propylene oxide and butylene oxide) by modifying the catalyst properties.

The narrow range ethoxylated alcohol non-ionic surfactant may comprise a linear narrow range ethoxylated alcohol non-ionic surfactant, a branched narrow range ethoxylated alcohol non-ionic surfactant, or a mixture thereof. When branched, the branching may be at the 1-position, the 2-position or even further down the alkyl chain, wherein the carbon counting starts as of the carbon linked to the oxygen linker between the alkyl chain and the ethoxylation chain, The branching may be a single branching or a multi-branching. Most preferably the branching is a single branching at the 2-position. The branching preferably is an alkyl branching, more preferably a methyl, ethyl, propyl, butyl or pentyl branching, most preferably mixtures thereof.

When branched, the narrow range ethoxylated alcohol non-ionic surfactant preferably comprises a mixture of surfactant isomers according to Formula I and surfactant isomers according to Formula II:

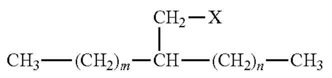 (I)

$$CH_3—(CH_2)_{m+n+3}—X \quad (II)$$

wherein m is between 4 and 11, preferably between 6 and 11, and n is between 0 and 5, and wherein about 50% to about 100%, preferably about 90% to about 100%, by weight of the narrow range ethoxylated alcohol non-ionic surfactant are isomers having m+n equal to 9, or wherein about 50% to about 100%, preferably about 90% to about 100%, by weight of the narrow range ethoxylated alcohol non-ionic surfactant are isomers having m+n equal to 11;

or wherein about 50% to about 100%, preferably about 90% to about 100%, by weight of the narrow range ethoxylated alcohol non-ionic surfactant are a mixture of isomers having m+n equal to 9 or 11; and wherein between about 25% and about 50% by weight of the mixture of surfactant isomers of Formula I have n=0; and wherein from about 0.001% to about 25%, by weight of the narrow range ethoxylated alcohol non-ionic surfactant are surfactants according to Formula II;

and wherein X is O-(EO)yH or O—($CH_2CH_2O$)yH, and wherein y is the average degree of ethoxylation between 6 and 12, preferably between 8 and 10, most preferably 9.

Preferably, from about 15% to about 40% by weight of the mixture of surfactant isomers of Formula I have n equal 1. Preferably, from about 5% to about 20% by weight of the mixture of surfactant isomers of Formula I have n equal 2. Preferably, from about 60% to about 90% by weight of the mixture of surfactant isomers of Formula I have n less than 3. Preferably, from 0% up to about 40% by weight of the mixture of surfactant isomers of Formula I have n larger than 2.

When the first ethoxylated alcohol non-ionic surfactant comprises a mixture of isomers having m+n equal to 9 or 11, then the weight ratio of the m+n isomers equal to 11 to m+n isomers equal to 9 is from 10:90 to 95:5 preferably from 30:70 to 90:10, most preferably from 50:50 to 85:15.

When linear the alkyl chain of the alcohol may have a natural distribution of C6 to C20 alkyl chains pending the source of the material. Alternatively, the linear alkyl alcohol may have been fractionated to magnify the C12 to C14 alkyl chain content.

The narrow range ethoxylated alcohol non-ionic surfactant may comprise a primary alcohol based narrow range ethoxylated alcohol non-ionic surfactant, a secondary alcohol based narrow range ethoxylated alcohol non-ionic surfactant, or a mixture thereof.

Preferably, the ethoxylated alcohol non-ionic surfactant comprises between 50% and 99%, preferably between 60% and 95%, more preferably between 70% and 90% by weight of the ethoxylated alcohol non-ionic surfactant of the narrow range ethoxylated alcohol non-ionic surfactant.

The ethoxylated alcohol non-ionic surfactant may comprise between 1% and 50%, preferably between 5% and 40%, more preferably between 10% and 30% by weight of the ethoxylated alcohol non-ionic surfactant of a broad range ethoxylated alcohol non-ionic surfactant. Preferably, the broad range ethoxylated alcohol non-ionic surfactant comprises an alkyl chain having an average of from 8 to 18 carbon atoms, preferably of from 10 to 16 more preferably 12 to 15 carbon atoms. The broad range ethoxylated alcohol non-ionic surfactant comprises polyethoxy groups, preferably, wherein between 15% and 45%, preferably between 25% and 40% by weight of the total broad range ethoxylated alcohol surfactant are ethoxylated alcohol nonionic surfactant molecules comprising a polyethoxy group comprising between 6 and 10 ethoxy groups, and wherein between 30% and 70%, preferably between 40% and 65% by weight of the total broad range ethoxylated alcohol surfactant are ethoxylated alcohol nonionic surfactant molecules comprise a polyethoxy group comprising between 5 and 12 ethoxy groups.

The broad range ethoxylated alcohol non-ionic surfactant may comprise linear alkyl chains, branched alkyl chains, or a mixture thereof, wherein linear and branched are defined as for the narrow range ethoxylated alcohol non-ionic surfactants above.

The broad range ethoxylated alcohol non-ionic surfactant may comprise a primary alcohol based broad range ethoxylated alcohol non-ionic surfactant, a secondary alcohol based broad range ethoxylated alcohol non-ionic surfactant, or a mixture thereof.

The narrow range and/or broad range ethoxylated alcohol non-ionic surfactants may be derived from a natural alcohol source, a synthetic alcohol source, or a mixture thereof. Most suitable natural sources include palm kernel oil, coconut oil, or mixtures thereof, preferably palm kernel oil. When the narrow range and/or broad range ethoxylated alkyl alcohol non-ionic surfactant are derived from a synthetic alcohol source, the synthetic alcohol source preferably is made via an oxo process, a Ziegler process, a Guerbet process, an aldol condensation process, or a mixture thereof. The resulting alcohols can optionally but preferably be further fractionated to magnify the C12 to C15 content within the starting alcohol.

Preferably the liquid laundry detergent composition comprises the narrow range ethoxylated alcohol non-ionic surfactant and the broad range ethoxylated alcohol non-ionic surfactant in a relative weight ratio of 10:1 to 1:1, preferably 5:1 to 1:1, most preferably 3:1 to 1:1.

Suitable examples of narrow range ethoxylated alcohol non-ionic surfactants are commercially available from the Nouryon company under the Berol or Ethylan tradenames, and from the Sasol company under the Novel tradename.

Process of Making

Those skilled in the art will be aware of standard techniques to make the liquid laundry detergent composition and the water-soluble unit dose article according to the present invention. Those skilled in the art will also be aware of standard techniques and methods to make the ingredients of the liquid laundry detergent composition of the present invention.

Process of Use

A further aspect of the present invention is a process of laundering fabrics comprising the steps of diluting between 200 and 3000 fold, preferably between 300 and 2000 fold, the water-soluble unit dose article according to the present invention with water to make a wash liquor, contacting fabrics to be treated with the wash liquor.

Preferably the wash liquor comprises between 5 L and 75 L, preferably between 7 L and 40 L, more preferably between 10 L and 20 L of water. Preferably, the wash liquor is at a temperature of between 5° C. and 90° C., preferably between 10° C. and 60° C., more preferably between 12° C. and 45° C., most preferably between 15° C. and 40° C. Preferably, washing the fabrics in the wash liquor takes between 5 minutes and 50 minutes, preferably between 5 minutes and 40 minutes, more preferably between 5 minutes and 30 minutes, even more preferably between 5 minutes and 20 minutes, most preferably between 6 minutes and 18 minutes to complete. Preferably, the wash liquor comprises between 1 kg and 20 kg, preferably between 3 kg and 15 kg, most preferably between 5 and 10 kg of fabrics. The wash liquor may comprise water of any hardness preferably varying between 0 gpg to 40 gpg.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Examples

Liquid detergent compositions suitable for use in water-soluble unit dose laundry detergent products have been prepared through mixing of the individual components in a batch type process. The impact of width of the ethoxylation distribution within ethoxylated alcohol non-ionic surfactants on product viscosity variation throughout dilution as well as on their elongational viscosity profile has been tested using the test methods described herein. Table 1 summarizes all compositions tested. Example 1 is a liquid detergent composition comprising a narrow range ethoxylated (NRE) alcohol non-ionic surfactant according to the invention. Examples A through H describe comparative compositions comprising broad range ethoxylated (BRE) alcohol non-ionic surfactants outside the scope of the invention; the Marlipal, Surfonic and Scionol non-ionic samples being derived from primary alcohols while Tergitol samples being derived from secondary alcohols.

TABLE 1

Liquid detergent compositions comprising NRE and BRE ethoxylated primary and secondary alcohol nonionic surfactants.

| As 100% active | Ex A | Ex B | Ex C | Ex D | Ex E | Ex F | Ex G | Ex H | Ex 1 |
|---|---|---|---|---|---|---|---|---|---|
| Marlipal 1216/7 (BRE)[1] | 5% | — | 15% | — | | | — | — | |
| Tergitol 15-S-7 (BRE)[2] | — | 5% | — | 15% | — | — | | | |
| Surfonic L24-9 (BRE)[3] | | | | | 15% | | | | |
| Tergitol 15-S-9 (BRE)[4] | | | | | | 15% | | | |
| Scionol 13-9 (BRE)[5] | | | | | | | 15% | | |
| Scionol 15-9 (BRE)[6] | | | | | | | | 15% | |
| Novel C24EO9 NRE (NRE)[7] | | | | | | | | | 15% |
| HLAS | 20% | 20% | 20% | 20% | 20% | 20% | 20% | 20% | 20% |
| MEA-C12-16AE3S | 17% | 17% | 17% | 17% | 17% | 17% | 17% | 17% | 17% |
| Fatty acid | 6.2% | 6.2% | 6.2% | 6.2% | 6.2% | 6.2% | 6.2% | 6.2% | 6.2% |
| Propanediol | 16.4% | 16.4% | 6.4% | 6.4% | 6.4% | 6.4% | 6.4% | 6.4% | 6.4% |
| Water | 8.4% | 8.4% | 8.4% | 8.4% | 8.4% | 8.4% | 8.4% | 8.4% | 8.4% |
| Monoethanolamine | 7.6% | 7.6% | 7.6% | 7.6% | 7.6% | 7.6% | 7.6% | 7.6% | 7.6% |
| Glycerol | 5.0% | 5.0% | 5.0% | 5.0% | 5.0% | 5.0% | 5.0% | 5.0% | 5.0% |
| Amphiphilic graft polymer[8] | 2.6% | 2.6% | 2.6% | 2.6% | 2.6% | 2.6% | 2.6% | 2.6% | 2.6% |
| HEDP chelant | 2.4% | 2.4% | 2.4% | 2.4% 0 | 2.4% | 2.4% | 2.4% | 2.4% | 2.4% |
| Fragrance | 2.1% | 2.1% | 2.1% | 2.1% | 2.1% | 2.1% | 2.1% | 2.1% | 2.1% |
| Dipropylene Glycol | 2.0% | 2.0% | 2.0% | 2.0% | 2.0% | 2.0% | 2.0% | 2.0% | 2.0% |
| ethoxylated polyethyleneimine[9] | 1.7% | 1.7% | 1.7% | 1.7% | 1.7% | 1.7% | 1.7% | 1.7% | 1.7% |
| Citric Acid | 0.6% | 0.6% | 0.6% | 0.6% | 0.6% | 0.6% | 0.6% | 0.6% | 0.6% |
| Lutensol XP100 | 0.5% | 0.5% | 0.5% | 0.5% | 0.5% | 0.5% | 0.5% | 0.5% | 0.5% |
| C12-16EO3 ethoxylated alcohol | 0.4% | 0.4% | 0.4% | 0.4% | 0.4% | 0.4% | 0.4% | 0.4% | 0.4% |
| Potassium Sulfite | 0.4% | 0.4% | 0.4% | 0.4% | 0.4% | 0.4% | 0.4% | 0.4% | 0.4% |
| Magnesium Chloride | 0.3% | 0.3% | 0.3% | 0.3% | 0.3% | 0.3% | 0.3% | 0.3% | 0.3% |
| Hydrogenated Castor Oil | 0.1% | 0.1% | 0.1% | 0.1% | 0.1% | 0.1% | 0.1% | 0.1% | 0.1% |
| Protease | 0.09% | 0.09% | 0.09% | 0.09% | 0.09% | 0.09% | 0.09% | 0.09% | 0.09% |
| Sodium Formate | 0.1% | 0.1% | 0.1% | 0.1% | 0.1% | 0.1% | 0.1% | 0.1% | 0.1% |
| Tripropylene Glycol | 0.1% | 0.1% | 0.1% | 0.1% | 0.1% | 0.1% | 0.1% | 0.1% | 0.1% |
| Dyes and minors | Balance | Balance | Balance | Balance | Balance | Balance | Balance | Balance | Balance |
| total surfactant | 25% | 25% | 35% | 35% | 35% | 35% | 35% | 35% | 35% |

[1]BRE surfactant derived from primary alcohol (C12-16 alkyl chain with average degree of ethoxylation of 7) - available from Sasol company

[2]BRE surfactant derived from secondary alcohol (C11-15 alkyl chain with average degree of ethoxylation of 7) - available from Dow company

[3]BRE surfactant derived from primary alcohol (C12-14 alkyl chain with average degree of ethoxylation of 9) - available from Huntsman company

[4]BRE surfactant derived from secondary alcohol (C11-15 alkyl chain with average degree of ethoxylation of 9) - available from Dow company

[5]BRE surfactant derived from primary alcohol (C13 alkyl chain with average degree of ethoxylation of 9) - received from Scion company

[6]BRE surfactant derived from secondary alcohol (C15 alkyl chain with average degree of ethoxylation of 9) - received from Scion company

[7]NRE surfactant derived from primary alcohol (C12-14 alkyl chain with average degree of ethoxylation of 9) - available from Sasol company

[8]polyethylene glycol graft polymer comprising a polyethylene glycol backbone (Pluriol E6000) and hydrophobic vinyl acetate side chains, comprising 40% by weight of the polymer system of a polyethylene glycol backbone polymer and 60% by weight of the polymer system of the grafted vinyl acetate side chains

[9]ethoxylated polyethyleneimine having an average degree of ethoxylation of 20 per EO chain and a polyethyleneimine backbone with MW of about 600

The viscosity upon dilution and elongational viscosity data of the compositions comprising C12-C14 primary alcohol based ethoxylated alcohol non-ionic surfactants hence single variably differing in average degree of ethoxylation and width of ethoxylation distribution are summarized in table 2. When comparing the data from example A with examples C and E one can see that a single variable increase in ethoxylated alcohol non-ionic level alters the rheology profile upon dilution from a thinning to a thickening profile, combined with a steep increase in elongational viscosity indicated by an increased capillary break-up time. Narrowing the width of ethoxylation distribution (Example 1) has been found to neutralize this thickening and increased elongational viscosity impact, facilitating product dispersion hence positively impacting the dissolution of the liquid detergent composition accordingly.

TABLE 2

Viscosity upon dilution and elongational viscosity data for primary NRE and BRE ethoxylated nonionic comprising compositions

| | | Viscosity upon dilution | | | Caber break-up time | |
|---|---|---|---|---|---|---|
| | | 100% PC | 90% PC | 80% PC | 100% PC | 90% PC |
| Example A | 5% Marlipal1216/7 | 802 cps | 366 cps (thinning) | 298 cps | 0.59 s | 0.28 s |
| Example C | 15% Marlipal1216/7 | 881 cps | 1901 cps (thickening) | 754 cps | 0.53 s | 1.85 s |
| Example E | 15% SurfonicL24-9 | 808 cps | 1476 cps (thickening) | 650 cps | 0.49 s | 2.08 s |
| Example 1 | 15% Novel 24/9 (NRE) | 882 cps | 719 cps (slight thinning) | 370 cps | 0.56 s | 0.63 s |

*PC = product concentration

As can be seen from the data in table 3 the same rheology impact trend is observed for BRE ethoxylated secondary alcohols (Examples, B, D, F) as well as an alternative BRE ethoxylated primary alcohol source (examples G and H), further illustrating the unique property displayed by the NRE ethoxylated alcohol non-ionic surfactant comprising composition (Example 1).

TABLE 3

Viscosity upon dilution and elongational viscosity data for alternative BRE ethoxylated nonionic comprising compositions

| | | Viscosity upon dilution | | | Caber break-up time | |
|---|---|---|---|---|---|---|
| | | 100% PC | 90% PC | 80% PC | 100% PC | 90% PC |
| Example B | 5% Tergitol 15S7 | 686 cps | 327 cps (thinning) | 262 cps | 0.51 s | 0.28 s |
| Example D | 15% Tergitol 15S7 | 795 cps | 1779 cps (thickening) | 1075 cps | 0.47 s | 1.77 s |
| Example F | 15% Tergitol 15S9 | 817 cps | 2151 cps (thickening) | 959 cps | 0.56 s | 4.07 s |
| Example G | 15% Scionol 13-9 | 789 cps | 2811 cps (thickening) | 1274 cps | 0.49 s | 26.74 s |
| Example H | 15% Scionol 15-9 | 858 cps | 2746 cps (thickening) | 1100 cps | 0.52 s | 13.58 s |

Test Methods:

Viscosity Upon Dilution:

The viscosity profile has been tested for starting product compositions as well as 90% and 80% active product concentrations, prepared through mixing respective amounts of the starting composition and demineralized water at 20° C. The rheological profile of the liquid laundry detergent compositions or reduced product concentrations was obtained using a TA Rheometer AR2000 at room temperature (20° C.). Pre-shear of samples was carried out at 50 $s^{-1}$ for 30 s, afterwards the shear rate was continuously increased from 0.1 $s^{-1}$ to 2000 $s^{-1}$ over 7 minutes. The viscosity values at 20 $s^{-1}$ were consequently reported. The larger the viscosity decay upon dilution, the easier product is getting dispersed hence the faster the finished product dissolves accordingly.

Elongational Viscosity (Caber Break-Up Time):

The elongational viscosity profile has been assessed both for the starting compositions as for the 90% active product concentrations, prepared as described above.

The elongational viscosity profile of the test compositions was assessed by measuring the break-up time of a capillary formed upon extension of a test sample to a certain strain using a Haake Caber I extensional rheometer (Caber:capillary break-up extensional rheometer). The sample diameter was set to 6 mm, initial sample height to 3 mm, final sample height to 8.63 mm, stretch profile was set to linear and strike time set on 100 ms. An increased break-up time (seconds) indicates an increased elongational viscosity hence stronger counter-force against liquid detergent dispersion, negatively impacting product dissolution accordingly.

What is claimed is:

1. A water-soluble unit dose article comprising a water-soluble film and a liquid laundry detergent composition;

wherein the liquid laundry detergent composition comprises a non-ionic surfactant, wherein the non-ionic surfactant comprises an ethoxylated alcohol non-ionic surfactant, wherein the ethoxylated alcohol non-ionic surfactant comprises a narrow range ethoxylated alcohol non-ionic surfactant;

wherein the narrow range ethoxylated alcohol non-ionic surfactant comprises an alkyl chain having an average of from about 8 to about 18 carbon atoms;

wherein the narrow range ethoxylated alcohol non-ionic surfactant has an average degree of ethoxylation between about 5 and about 12; and wherein the narrow range ethoxylated alcohol non-ionic surfactant comprises polyethoxy groups, and wherein at least about 85% by weight of the total narrow range ethoxylated alcohol surfactant are ethoxylated alcohol non-ionic surfactant molecules comprising a polyethoxy group comprising between about 5 and about 12 ethoxy groups, wherein the ethoxylated alcohol non-ionic surfactant comprises between about 1% and about 50% by weight of the ethoxylated alcohol non-ionic surfactant of a broad range ethoxylated alcohol non-ionic surfactant;

wherein the narrow range ethoxylated alcohol non-ionic surfactant and the broad range ethoxylated alcohol non-ionic surfactant in a relative weight ratio of about 10:1 to about 1:1; and wherein the liquid laundry detergent composition comprises between about 1% and about 20% by weight of the liquid laundry detergent composition of water.

2. The water-soluble unit dose article according to claim 1, wherein the narrow range ethoxylated alcohol non-ionic surfactant comprises a linear narrow range ethoxylated alcohol non-ionic surfactant, a branched narrow range ethoxylated alcohol non-ionic surfactant, or a mixture thereof.

3. The water-soluble unit dose article according to claim 1, wherein the narrow range ethoxylated alcohol non-ionic surfactant comprises a primary alcohol based narrow range ethoxylated alcohol non-ionic surfactant, a secondary alcohol based narrow range ethoxylated alcohol non-ionic surfactant, or a mixture thereof.

4. The water-soluble unit dose article according to claim 1 wherein the liquid laundry detergent composition comprises between about 3% and about 30% by weight of the liquid laundry detergent composition of the ethoxylated alcohol non-ionic surfactant.

5. The water-soluble unit dose article according to claim 1 wherein the ethoxylated alcohol non-ionic surfactant comprises between about 50% and about 99% by weight of the ethoxylated alcohol non-ionic surfactant of the narrow range ethoxylated alcohol non-ionic surfactant.

6. The water-soluble unit dose article according to claim 1 wherein the broad range ethoxylated alcohol non-ionic surfactant comprises an alkyl chain having an average of from about 8 to about 18 carbon atoms;

wherein the broad range ethoxylated alcohol non-ionic surfactant comprises polyethoxy groups, and wherein between about 15% and about 45% by weight of the total broad range ethoxylated alcohol surfactant are ethoxylated alcohol non-ionic surfactant molecules comprising a polyethoxy group comprising between about 6 and about 10 ethoxy groups, and and wherein between about 30% and about 70% by weight of the total broad range ethoxylated alcohol surfactant are ethoxylated alcohol non-ionic surfactant molecules comprising a polyethoxy group comprising between about 5 and about 12 ethoxy groups.

7. The water-soluble unit dose article according to claim 6 wherein the broad range ethoxylated alcohol non-ionic surfactant comprises a linear broad range ethoxylated alcohol non-ionic surfactant, a branched broad range ethoxylated alcohol non-ionic surfactant, or a mixture thereof, and wherein the broad range ethoxylated alcohol non-ionic surfactant comprises a primary alcohol broad range ethoxylated alcohol non-ionic surfactant, a secondary alcohol broad range ethoxylated alcohol non-ionic surfactant, or a mixture thereof.

8. The water-soluble unit dose article according to claim 6, wherein i) the narrow range ethoxylated alcohol non-ionic surfactant is derived from a natural alcohol source, a synthetic alcohol source, or a mixture thereof, ii) the broad range ethoxylated alcohol non-ionic surfactant is derived from a natural alcohol source, a synthetic alcohol source, or a mixture thereof, iii) or a mixture thereof.

9. The water-soluble unit dose article according to claim 8, wherein i) the narrow range ethoxylated alcohol non-ionic surfactant is derived from a synthetic alcohol source, wherein the synthetic alcohol source is made via an oxo process, a Ziegler process, a Guerbet process, an aldol condensation process, or a mixture thereof;

ii) the broad range ethoxylated alcohol non-ionic surfactant is derived from a synthetic alcohol source, wherein the synthetic alcohol source is made via an oxo process, a Ziegler process, a Guerbet process, an aldol condensation process, or a mixture thereof;

iii) or a mixture thereof.

10. The water-soluble unit dose article according to claim 1, wherein the liquid laundry detergent composition comprises a non-soap anionic surfactant, wherein the non-soap anionic surfactant is selected from neutralised linear alkylbenzene sulphonate, neutralised alkyl sulphate anionic surfactant selected from neutralised alkoxylated alkyl sulphate, neutralised non-alkoxylated alkyl sulphate, and mixtures thereof, or a mixture thereof.

11. The water-soluble unit dose article according to claim 10, wherein the weight ratio of non-soap anionic surfactant to ethoxylated alcohol non-ionic surfactant in the liquid laundry detergent composition is between 1:1 to 20:1.

12. The water-soluble unit dose article according to claim 10 wherein the liquid laundry detergent composition comprises a fatty acid, wherein the fatty acid is a neutralized fatty acid soap.

13. The water-soluble unit dose article according to claim 10, wherein the liquid laundry detergent comprises between about 5% and about 15% by weight of the liquid detergent composition of water.

14. The water-soluble unit dose article according to claim 10, wherein the liquid laundry detergent composition comprises between about 10% and about 40% by weight of the liquid laundry detergent composition of a non-aqueous solvent selected from 1,2-propanediol, dipropylene glycol, tripropyleneglycol, glycerol, sorbitol, polyethylene glycol, ethoxylated glycerin or a mixture thereof.

15. The water-soluble unit dose article according to claim 10, wherein the water-soluble film comprises polyvinyl alcohol polymer, wherein the water-soluble film comprises polyvinyl alcohol homopolymer, polyvinyl alcohol copolymer, or mixtures thereof.

* * * * *